US008026456B2

(12) United States Patent
Achtner et al.

(10) Patent No.: US 8,026,456 B2
(45) Date of Patent: Sep. 27, 2011

(54) TIG WELDING SYSTEM AND METHOD

(75) Inventors: Richard Mark Achtner, Appleton, WI (US); Bruce Patrick Albrecht, Grayslake, IL (US); LeRoy H. Lauer, Jr., Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 473 days.

(21) Appl. No.: 11/969,789

(22) Filed: Jan. 4, 2008

(65) Prior Publication Data
US 2008/0197116 A1 Aug. 21, 2008

Related U.S. Application Data

(60) Provisional application No. 60/902,315, filed on Feb. 20, 2007.

(51) Int. Cl.
B23K 9/167 (2006.01)
B23K 9/28 (2006.01)
B23K 9/133 (2006.01)
(52) U.S. Cl. ...................................... 219/75; 219/137.2
(58) Field of Classification Search ............... 219/137.2, 219/137.31, 137.44, 137.61, 137.7, 75; B23K 9/167, B23K 37/00
See application file for complete search history.

(56) References Cited

U.S. PATENT DOCUMENTS

| | | | | |
|---|---|---|---|---|
| 2,550,495 A * | 4/1951 | Pilia | ............................... | 219/127 |
| 2,571,684 A * | 10/1951 | Craven | ............................ | 219/75 |
| 2,694,763 A * | 11/1954 | Muller | ............................ | 219/74 |
| 2,710,902 A * | 6/1955 | Pilia | ................................. | 219/74 |
| 2,778,099 A * | 1/1957 | Anderson et al. | ............... | 228/41 |
| 2,794,894 A * | 6/1957 | Tudbury | ....................... | 219/639 |
| 2,855,679 A | 10/1958 | Gribble | | |
| 2,856,509 A * | 10/1958 | Stanchus | ......................... | 219/74 |
| 2,866,887 A * | 12/1958 | Kumagai | ................. | 219/124.21 |
| 2,948,803 A * | 8/1960 | Wilson et al. | ................... | 219/74 |
| 2,952,232 A * | 9/1960 | Sipala | .............................. | 228/53 |
| 3,101,689 A * | 8/1963 | Hammond et al. | ........... | 226/128 |
| 3,248,515 A * | 4/1966 | Gorman et al. | ............ | 219/137.9 |
| 3,250,453 A * | 5/1966 | Halstead | ......................... | 228/52 |

(Continued)

FOREIGN PATENT DOCUMENTS
DE 4108206 9/1992
(Continued)

OTHER PUBLICATIONS machine translation of DE 4108206, May 2011.*
(Continued)

Primary Examiner — Geoffrey S Evans
(74) Attorney, Agent, or Firm — Fletcher Yoder

(57) ABSTRACT

The invention provides a welding arrangement designed to respond to the need of an improved welding system that aids in supplying filler material to a weld location. Provided is a welding system including a welding gun and a welding wire feed directly coupled to the welding gun. The welding gun includes a filler material housing, a filler material positioning extension, and a manual advancement device configured to advance a filler material through the welding wire feed. Further provided is a method of operating a welding gun. The method includes passing a current between an electrode and a work piece at a weld location, and advancing a filler material toward the weld location via a channel of a positioning extension in response to engagement of a manual advancement device.

27 Claims, 9 Drawing Sheets

U.S. PATENT DOCUMENTS

| | | | | |
|---|---|---|---|---|
| 3,356,273 | A * | 12/1967 | Wallace | 219/137.2 |
| 3,548,143 | A * | 12/1970 | Reeh | 219/75 |
| 3,617,688 | A * | 11/1971 | Fogelstrom | 219/137.7 |
| 3,939,321 | A * | 2/1976 | Bertrand et al. | 219/69.14 |
| 3,940,586 | A * | 2/1976 | Stearns et al. | 219/75 |
| 4,206,862 | A * | 6/1980 | DaCosta | 219/137.2 |
| 4,493,971 | A * | 1/1985 | Nawa et al. | 219/137.52 |
| 4,667,082 | A | 5/1987 | Shibata et al. | |
| 4,670,821 | A | 6/1987 | Treadway | |
| 4,879,446 | A * | 11/1989 | Morgan et al. | 219/75 |
| 4,924,053 | A | 5/1990 | Morgan et al. | |
| 4,924,063 | A | 5/1990 | Buchel et al. | |
| 4,942,281 | A * | 7/1990 | Srba | 219/75 |
| 4,973,822 | A * | 11/1990 | Evans et al. | 219/137 PS |
| 5,155,332 | A * | 10/1992 | Maguire | 219/137.2 |
| 5,584,426 | A * | 12/1996 | Ziesenis | 219/137.2 |
| 5,782,394 | A * | 7/1998 | Langley | 219/137.2 |
| 5,813,591 | A * | 9/1998 | Quinn et al. | 228/41 |
| 5,839,642 | A * | 11/1998 | Tait | 228/41 |
| 6,064,036 | A * | 5/2000 | Kensrue | 219/137.2 |
| 6,066,823 | A * | 5/2000 | Lageose | 219/60.2 |
| 6,213,375 | B1 * | 4/2001 | Rybicki | 228/41 |
| 6,352,354 | B1 | 3/2002 | Boillot et al. | |
| 6,437,281 | B1 | 8/2002 | Zhang et al. | |
| 6,559,405 | B2 | 5/2003 | Mehl | |
| 6,596,969 | B1 | 7/2003 | Sakurai et al. | |
| 6,600,133 | B2 | 7/2003 | Watanabe et al. | |
| 6,924,452 | B2 | 8/2005 | Kimura | |
| 7,078,646 | B2 * | 7/2006 | Borne et al. | 219/75 |
| 7,186,950 | B1 | 3/2007 | Fisher | |
| 7,329,834 | B2 * | 2/2008 | Kaufman et al. | 219/137.71 |
| 2003/0062354 | A1 * | 4/2003 | Ward | 219/75 |
| 2005/0065483 | A1 * | 3/2005 | Nakao | 604/264 |
| 2005/0121424 | A1 | 6/2005 | Caldwell et al. | |

FOREIGN PATENT DOCUMENTS

| | | | |
|---|---|---|---|
| FR | 2765508 | | 1/1999 |
| GB | 2067765 | | 7/1981 |
| JP | 57-88978 A | * | 6/1982 |
| JP | 7060454 | | 3/1995 |
| JP | 9-141435 A | * | 6/1997 |
| JP | 2000042746 | | 2/2000 |
| JP | 2001287037 | | 10/2001 |
| JP | 2002153445 | | 5/2002 |
| JP | 2003136242 | | 5/2003 |
| JP | 2007030006 | | 2/2007 |

OTHER PUBLICATIONS machine translation of Japan Patent document No. 2000-042,746, May 2011.* machine translation of Japan Patent document No. 2001-287,037, May 2011.* machine translation of Japan Patent document No. 2007-030,006, May 2011.*

Butters TIGun Brochure; pdf format.

Photo of product in Butters TIGun brochure.

CK Worldwide Inc.; hand held torches; web page: http:www.ckworldwide.com/coldwire_hand.htm.

CK Worldwide Inc.; machine mounted torches; web page: http:www.ckworldwide.com/coldwire_machine.htm.

OTC; The World's Fist Hand-Held Automatic Welding Machine; TIGun; Cat No. A050.

* cited by examiner

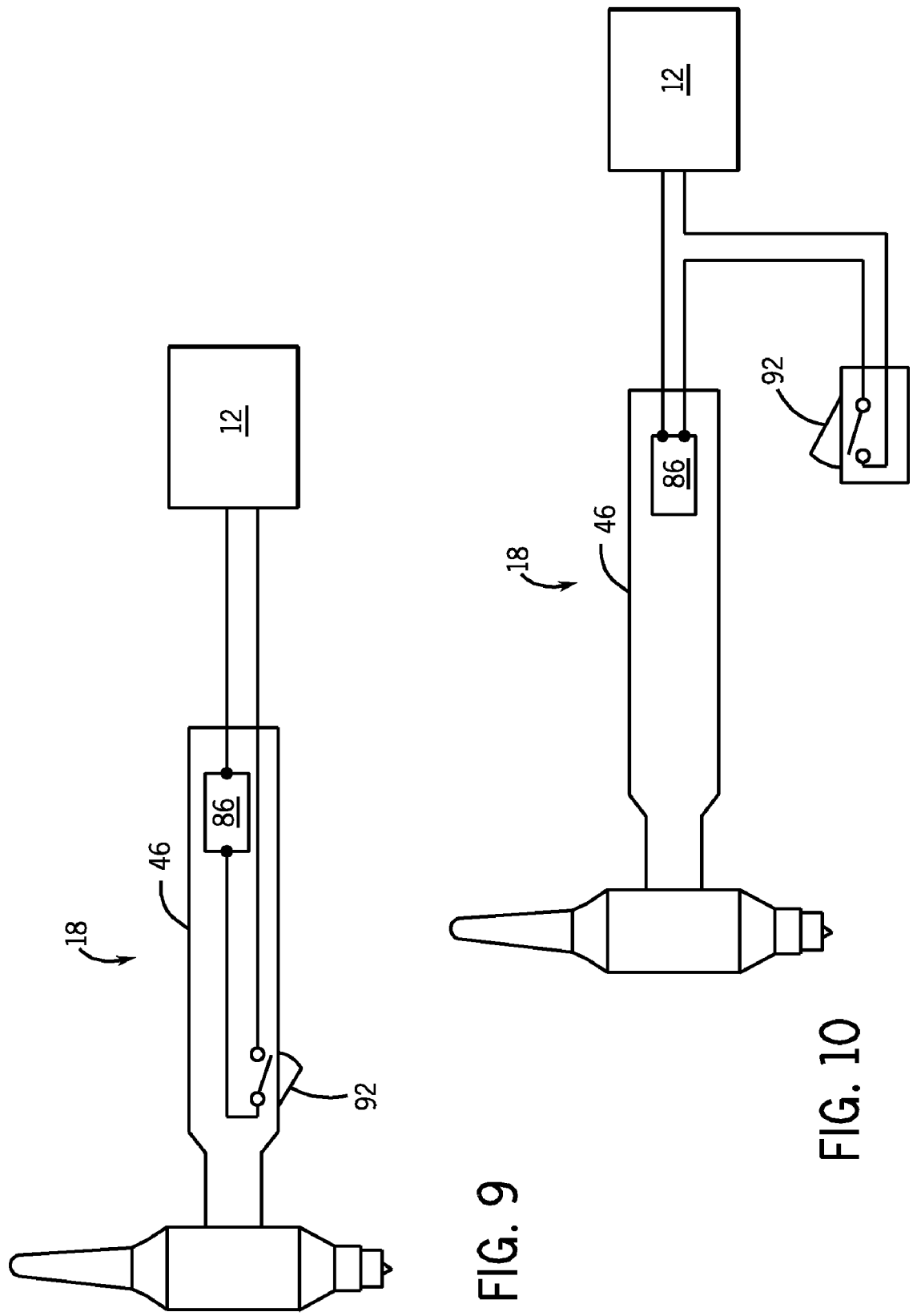

TIG WELDING SYSTEM AND METHOD

CROSS REFERENCE TO RELATED APPLICATIONS

This application claims priority to U.S. Provisional Patent Application No. 60/902,315, entitled "TIG Welding System and Method", filed on Feb. 20, 2007, which is herein incorporated by reference.

BACKGROUND

The invention relates generally to the field of welding systems, and particularly to welding systems that supply a filler material to weld locations during welding.

Welding systems generally include an electrode configured to pass an arc between a torch and a work piece, thereby heating the work piece to create a weld. In many systems, such as metal inert gas (MIG) welding and stick welding systems, the electrode is a consumable wire that melts into the weld to provide a filler material into the weld. In other words, a single wire serves both as an electrode and as the filler material. In contrast, tungsten inert gas (TIG) welding systems employ a non-consumable tungsten electrode that is independent from the filler material. In other words, the TIG welding process does not melt the tungsten electrode into the weld forming on the work piece. Instead, a user generally holds the TIG torch with the tungsten electrode in a right hand, while the user simultaneously and independently holds the filler material in a left hand. Unfortunately, this two-handed technique for TIG welding does not leave any hands free for controlling the welding current, wire feed rate, and so forth. Thus, a user may need to stop the welding process (e.g., set down the TIG torch or the tungsten electrode) in order to adjust various controls. As a result, the welding process may create a less than desirable weld due to the delays in adjustments, breaks in the weld continuity, and so forth.

BRIEF DESCRIPTION

In certain embodiments, a welding torch includes both a welding electrode and a filler material, which are independently supported and guided toward a weld on a work piece. For example, one embodiment includes a welding system having a welding gun and a welding wire feed directly coupled to the welding gun. The welding gun includes a filler material housing, a filler material positioning extension, and a manual advancement device configured to advance a filler material through the welding wire feed.

In accordance with another embodiment, a system includes a welding torch. The welding torch includes a nozzle having an electrode and a filler material positioning extension. The filler material positioning extension has an extension channel that terminates at an extension end proximate the electrode. The extension end is capable of being manipulated between at least a first position and a second position.

In accordance with another embodiment, a welding gun includes a torch body having a body axis, a torch handle having a handle axis, a torch nozzle having a nozzle axis, an electrode having an electrode axis, a wire feeder having a feeder axis, and a wire positioning extension. The wire positioning extension includes a guide channel having a guide channel axis and an exit channel having an exit channel axis. The exit channel terminates proximate the electrode. The body axis, the handle axis, the nozzle axis, the electrode axis, the guide channel axis, and the exit channel axis are located in a first plane.

Another embodiment, includes a wire feeder retrofit kit. The wire feeder retrofit kit includes a wire feeder that includes a filler material housing, a filler material positioning extension, and a manual advancement device configured to advance the filler material. Further, the wire feeder is configured to be coupled to a welding gun, and the wire feeder is configured to guide the filler material toward an electrode of the welding gun.

Another embodiment includes a method of operating a welding gun. The method includes passing a current between an electrode and a work piece at a weld location, and advancing a filler material toward the weld location via a channel of a positioning extension in response to engagement of a manual advancement device.

DRAWINGS

These and other features, aspects, and advantages of the present invention will become better understood when the following detailed description is read with reference to the accompanying drawings in which like characters represent like parts throughout the drawings, wherein.

Figure 1:
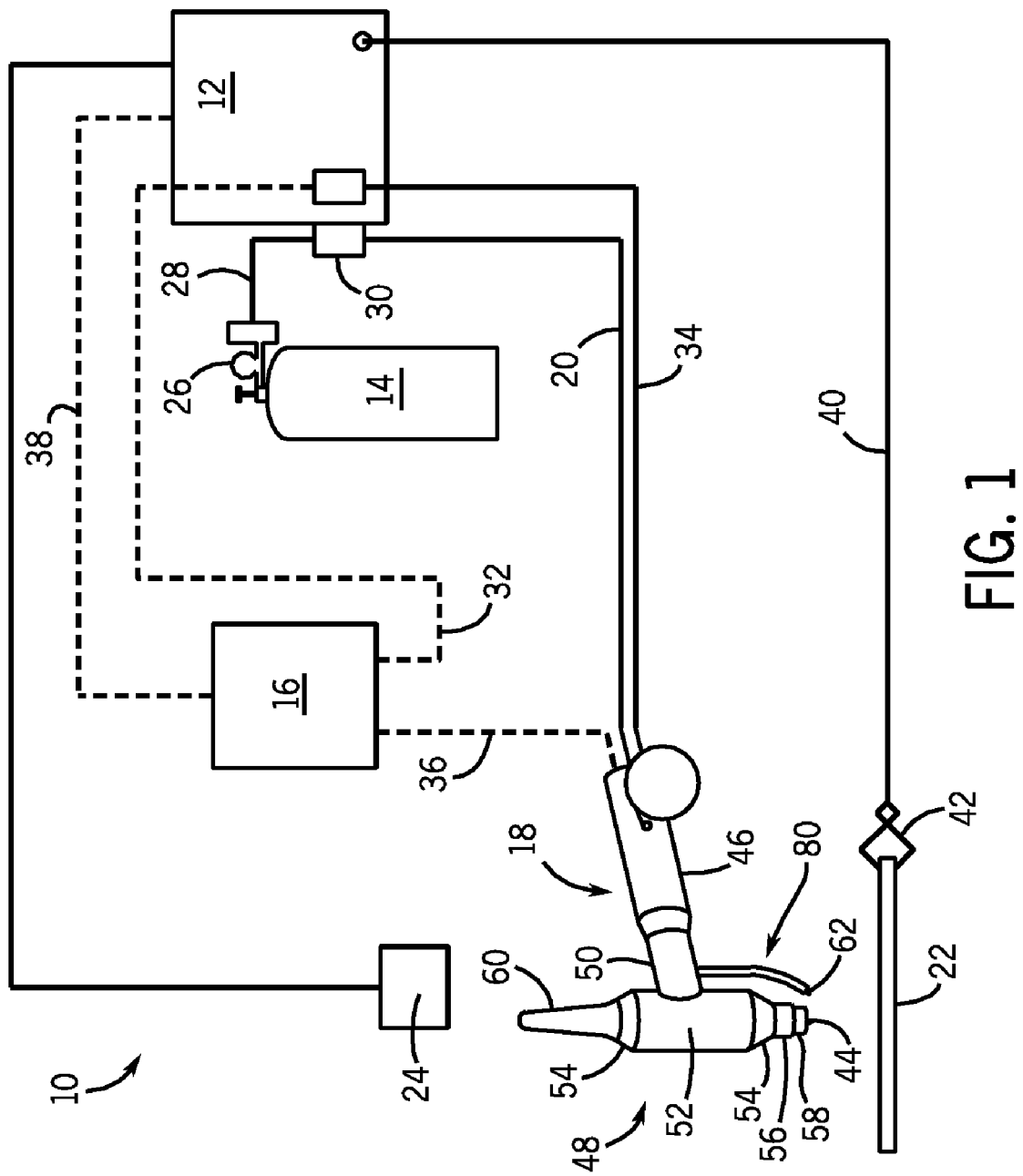
FIG. 1 is an illustration of an exemplary welding system in accordance with embodiments of the present invention.
Figure 6:
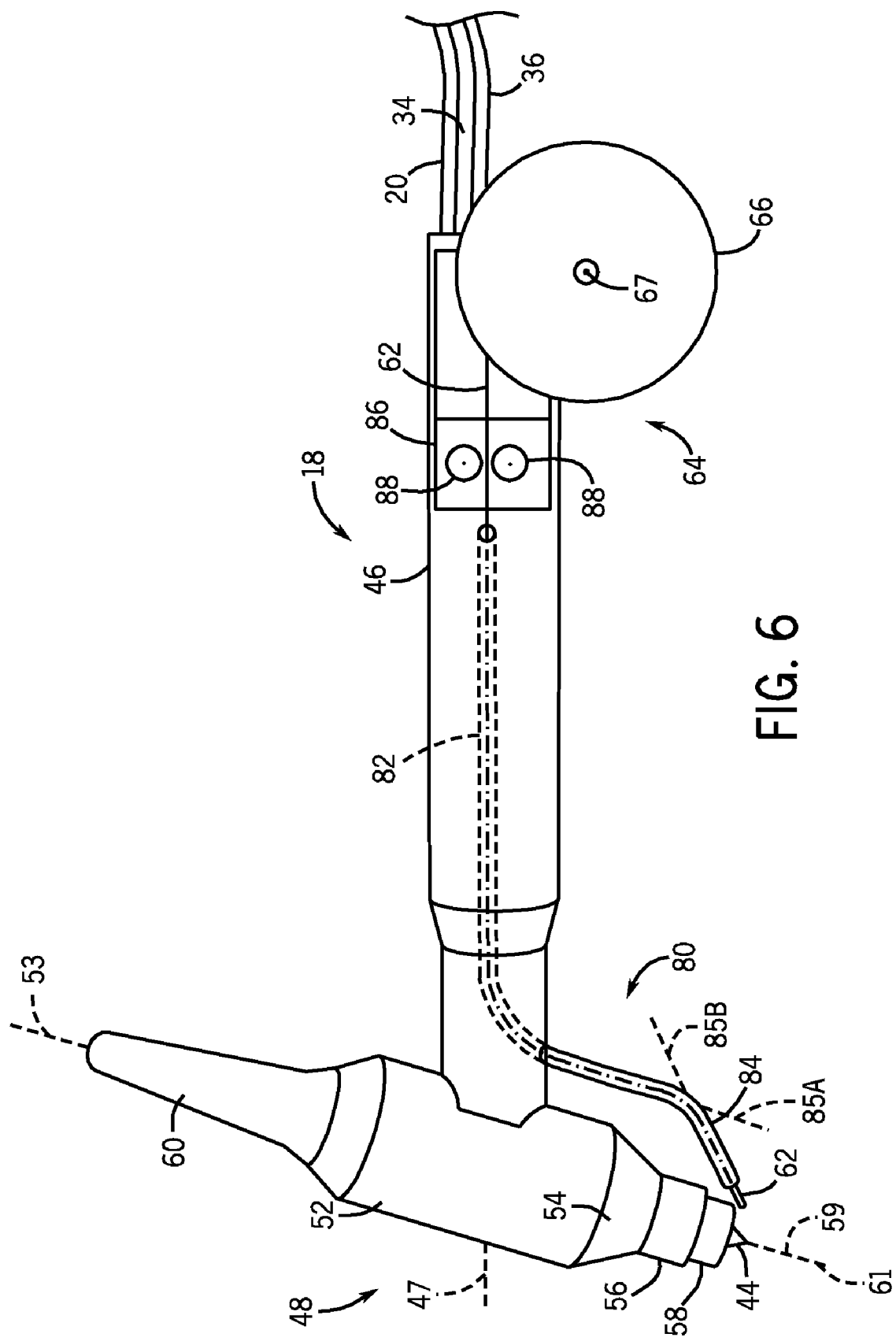
Figure 7:
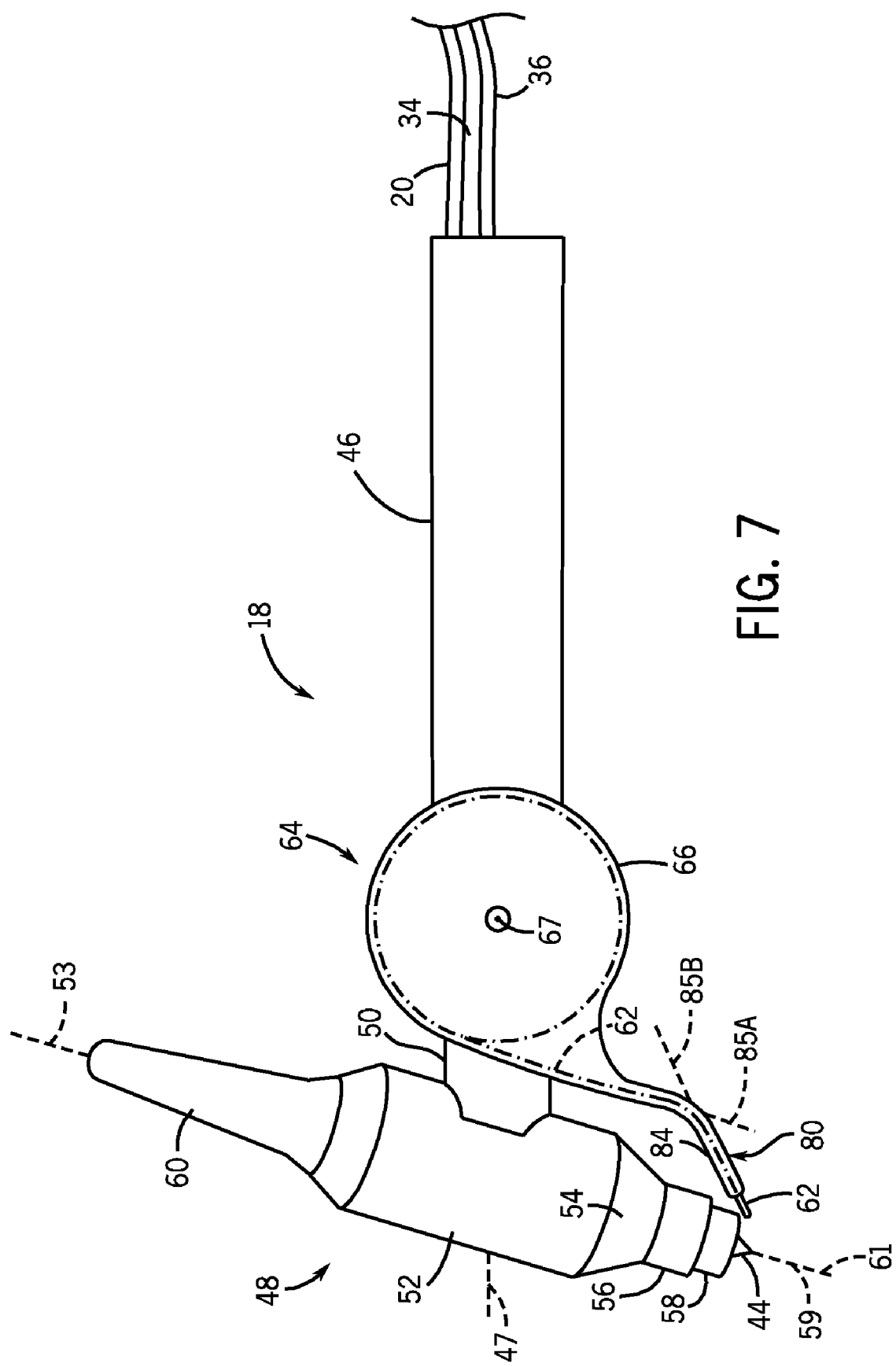
Figure 8:
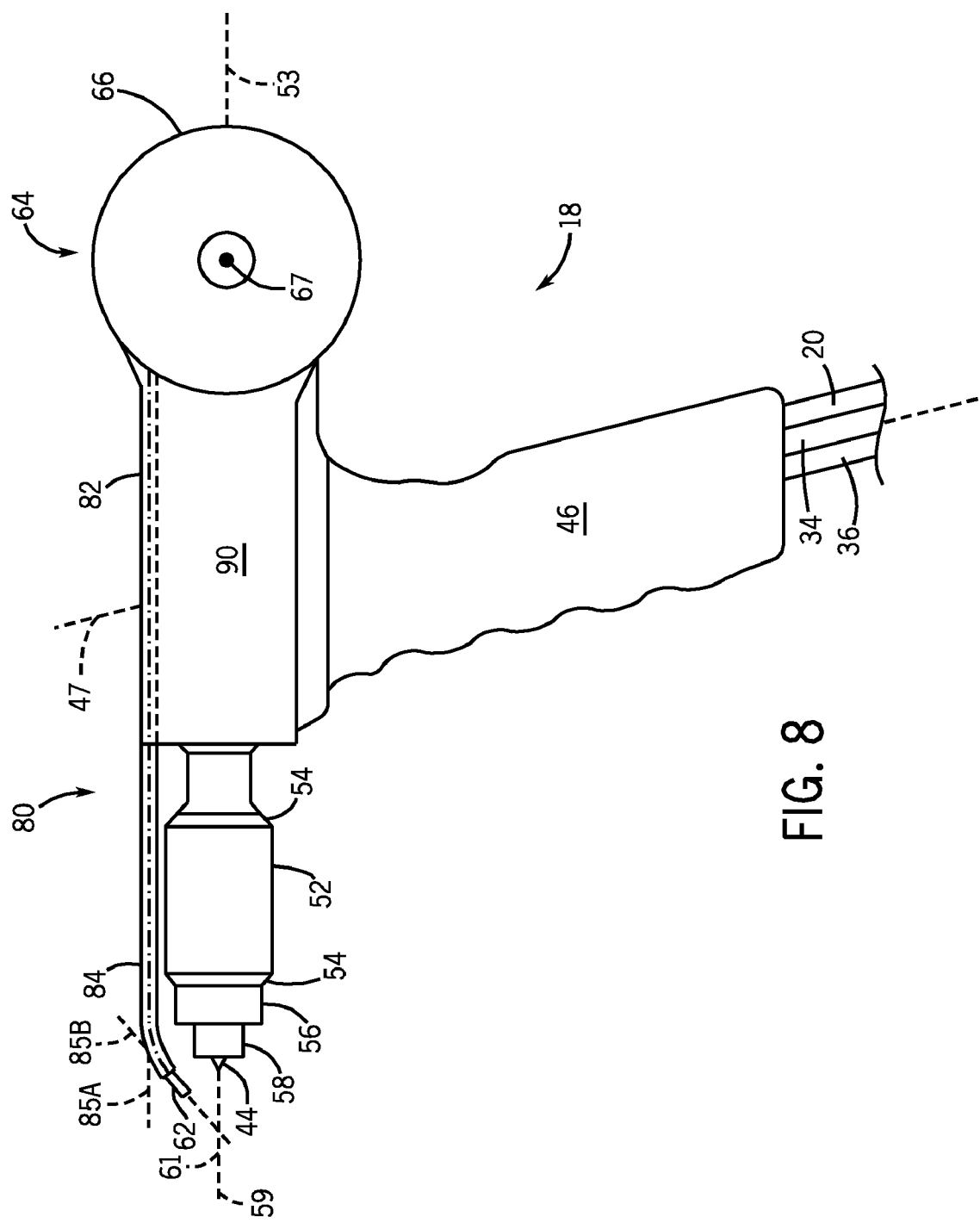
Figure 11:
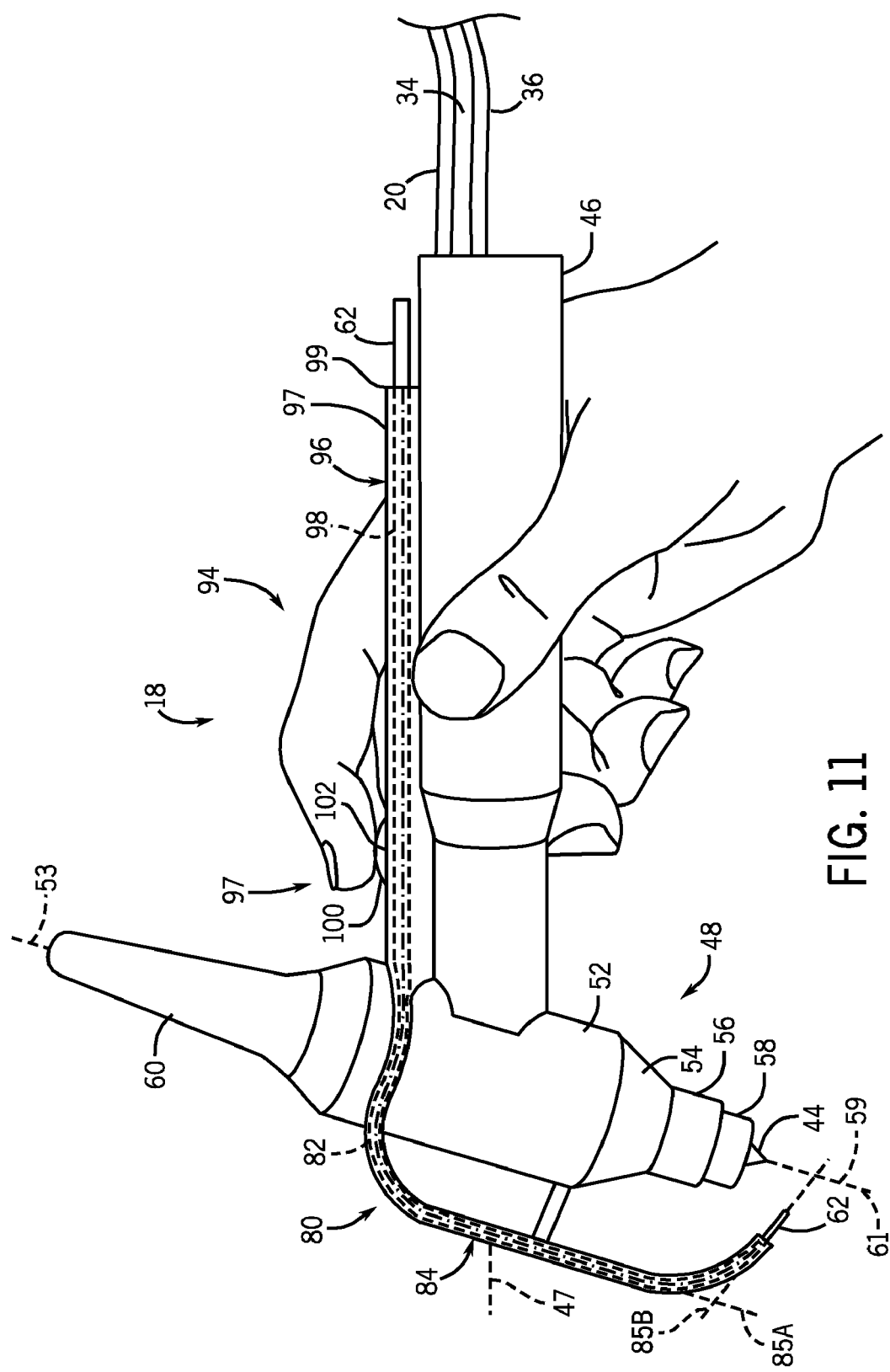
Figure 12:
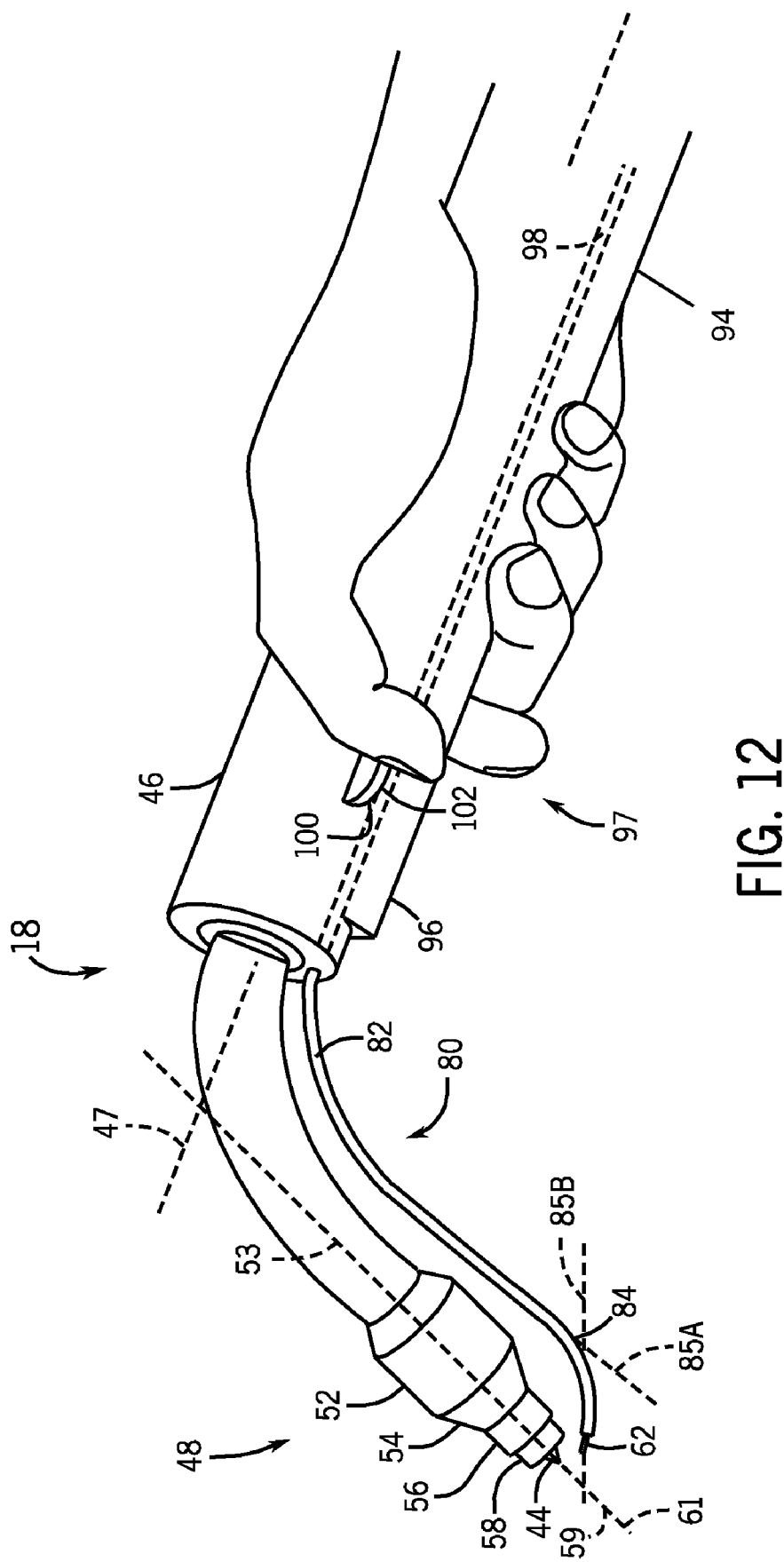

FIGS. 6, 7, and 8 are illustrations of alternate embodiments of the torch of the welding system of FIG. 1;

FIG. 9 is a schematic of an exemplary embodiment of a remote mechanism of the torch of the welding system of FIG. 1;

FIG. 10 is a schematic of an alternate embodiment of a remote mechanism of the torch of the welding system of FIG. 1; and FIGS. 11 and 12 are illustrations of further alternate embodiments of the torch of the welding system of FIG. 1.

DETAILED DESCRIPTION

Referring now to FIG. 1, a welding system 10 in accordance with one embodiment of the present technique is illustrated with both an electrode 44 and a filler material 62 in an independent arrangement. As discussed in greater detail below, the filler material 62 may be thermally shielded and/or disposed away from the electrode 44, which generates a significant amount of heat during a welding process. In other words, the electrode 44 and the filler material 62 may be kept apart from one another to reduce the possibility of the filler material 62 corrupting the electrode 44, or the electrode 44 prematurely melting the filler material 62, or both. In the illustrated embodiment, the welding system 10 includes a tungsten inert gas (TIG) welding system, and thus the electrode 44 is a non-consumable tungsten electrode. However, other embodiments may include other types of consumable or non-consumable electrodes. Further, as discussed in greater detail below, the unified support of both the electrode 44 and the independent filler material 62 on the torch 18 enables a one-handed operation of the torch 18, such that a user can use a free hand to adjust welding controls, steady his/her position, grab the work piece, and so forth. Moreover, the unified support of both the electrode 44 and the filler material 62 on the torch 18 improves the spacing, direction, and general position of the filler material 62 relative to the electrode 44, rather than requiring independent positioning of the electrode 44 and the filler material 62 in different hands of the user. In other words, the spacing, angle, and general orientation of the filler material 62 relative to the electrode 44 remain consistent throughout the welding process. In some embodiments, the orientation between the filler material 62 and the electrode 44 may be changed by a guide structure. Furthermore, in some embodiments, the feed rate of the filler material 62 and other welding parameters may be controlled directly on the torch 18 rather than the power source 12.

As depicted, the TIG welding system 10 includes a power source 12, a shielding gas source 14, a cooling system 16, and a torch 18. In the illustrated embodiment, the power source 12 provides power to the welding torch 18 via a supply conduit 20. The power source 12 may supply a direct current (DC) or alternating current (AC) to the torch 18 depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., 60 Hz) current may generate a wide arc with shallow penetration of a work piece 22, while a high AC frequency (e.g., 200 Hz) current may generate a focused arc with deeper penetration into the work piece 22.

In addition to the frequency of the current, the power source 12 may vary the amperage of the current output to the torch 18. The setting for the amperage output by the power source 12 may be adjusted by a setting a knob or button on the power source 12, or may be set by a remote control 24. For example, a welding system 10 may include a foot pedal remote control 24 that allows the operator to make current adjustments during welding by either holding down the foot pedal or feathering the foot pedal remote control 24 to vary the amperage. The remote control 24 may also include a finger tip control, audible command, or other form of input to signal the power source 12 to output a corresponding current.

In addition, the torch 18 may be supplied with a shielding gas from a supply 14. In general, the shielding gas may be supplied to the torch 18 and expelled from the torch at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrode to the metal and may help to start and maintain a stable arc.

As depicted in FIG. 1, the shielding gas may be provided in a container and delivered to the torch 18 via a regulator 26, a conduit 28, a gas valve 30, and the supply conduit 20. The regulator 26 may allow an operator to limit the pressure of the gas delivered to the gas valve 30 to obtain a desired flow rate. Further, the gas valve 30 may provide for stopping and starting the flow of the shielding gas to the torch 18 in coordination with other welding operations.

The TIG welding system 10 may be provided with a cooling system 16 to reduce heat build-up. The cooling system may take various forms including gas cooled and liquid cooled systems. The cooling system 16 may provide for circulation of the coolant via coolant supply conduits 32 and 34 and coolant return conduit 36. The cooling system may be powered from the power supply 12 via a coolant system power cord 38.

In general, the welding system 10 may provide for current flow via a work piece 22 to the power source 12. For example, as depicted in FIG. 1, the welding system 10 may include a cable 40 that is secured to the work piece 22 via a work clamp 42. In this configuration, the current provided by the power source 12 flows through the supply conduit to the torch 18, flows across an arc from an electrode 44 to the work piece 22, and returns to the power source 12 via the work clamp 42 and the cable 40.

Figure 2:
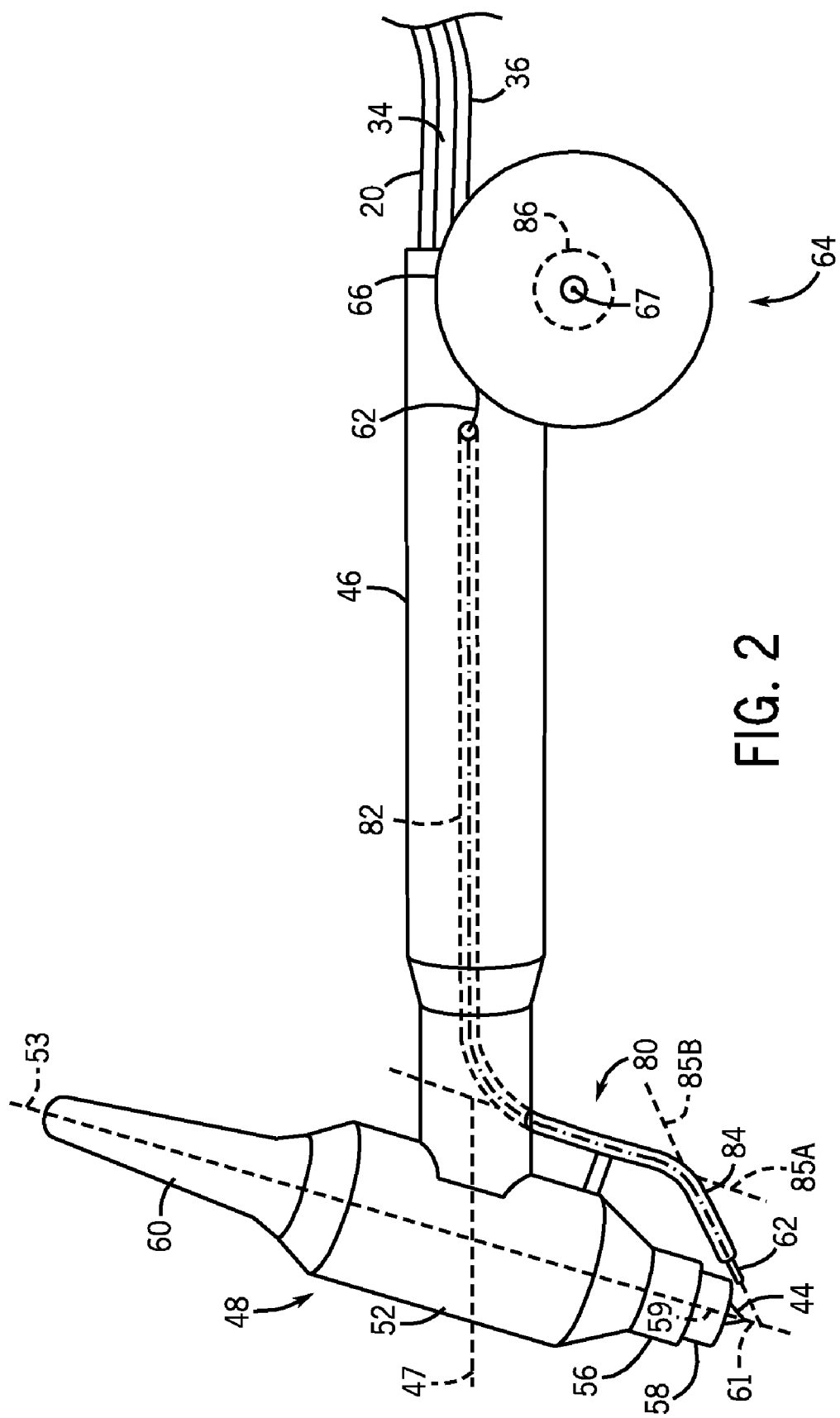
FIG. 2 is an illustration of an exemplary embodiment of a torch of the welding system of FIG. 1.

As illustrated in FIGS. 1 and 2, one embodiment of the TIG welding torch 18 includes a handle 46 that is attached to a torch body 48. The handle 46 includes a handle axis 47 (see FIG. 2) running along its length, and may include a hollow interior to facilitate routing power, shielding gas, and coolant to the welding torch 18. The torch body 48 may also include a torch neck 50 and a torch head 52, as illustrated. The torch body 48 may provide a central-rigid support to mount hardware on the torch 18. For example, the torch neck 50 provides for securing the handle 46 to other components, and enables an operator to hold and manipulate the welding torch 18 and its components via the handle 46. The torch body 48 may include a body axis 53 (see FIG. 2) running along its length, through the torch head 52 and through the torch neck 50.

Other components of the welding torch 18 that are coupled to the torch body 48 may include an insulator 54, a nozzle 56, a collet 58, the electrode 44, and a back cap 60. The insulator 54 may be positioned on the interior of the torch body 48 to block heat produced by the welding current from passing into the torch body 48 and/or the handle 46. The nozzle 56 may be attached to the insulator 54 or the torch head 52 of the torch body 48. The nozzle 56 may include a hollow tubular shaped piece that encloses the collet 58 and the electrode 44, and provides a path for the shielding gas to pass between an interior surface of the nozzle 56 and the collet 58. As illustrated, the nozzle 56 may include a nozzle axis 59 (see FIG. 2) that runs along its length. In one embodiment, the nozzle axis 59 is coaxial with the body axis 53. Further, the electrode 44 may include an electrode axis 61 (see FIG. 2) that runs along its length and that is coaxial with the nozzle axis 59 and/or the body axis 53.

The illustrated welding system 10 also includes the filler material 62. As discussed above, the torch 18 supports the filler material 62 independently from the electrode 44, such that a user does not need to hold the filler material 62 separate from the torch 18. The illustrated torch 18 also facilitates advancing and/or supplying the filler material 62 to the weld location and weld pool as needed. For example, a source of the filler material 62 may be located proximate (e.g. local) to the welding torch 18, such that it can be fed to the weld location in a consistent manner relative to the electrode 44. One embodiment of the torch 18 may include a spool containing a coil of filler material 62 attached to the torch 18. For example, as depicted in FIG. 2, the welding torch 18 may include a spool assembly 64 coupled to the end of the torch handle 46 opposite the torch body 48. The spool assembly 64 may include a spool 66 that is configured to house and support the filler material 62. The filler material 62 may include a wire that is wound about the spool 66, for example. In one embodiment, the spool 66 may be rotated to discharge the filler material 62 that is wound about the spool 66. For example, as depicted in FIG. 2, the spool 66 may be rotated counter-clockwise about a spool axis 67 to un-roll the filler material 62 such that the filler material 62 is guided along the torch 18 and to the weld location. As depicted in the illustrated embodiment, the spool axis 67 may run transverse to the handle axis 47, and or the body, the nozzle, and the electrode axes 53, 59, and 61.

Figure 3:
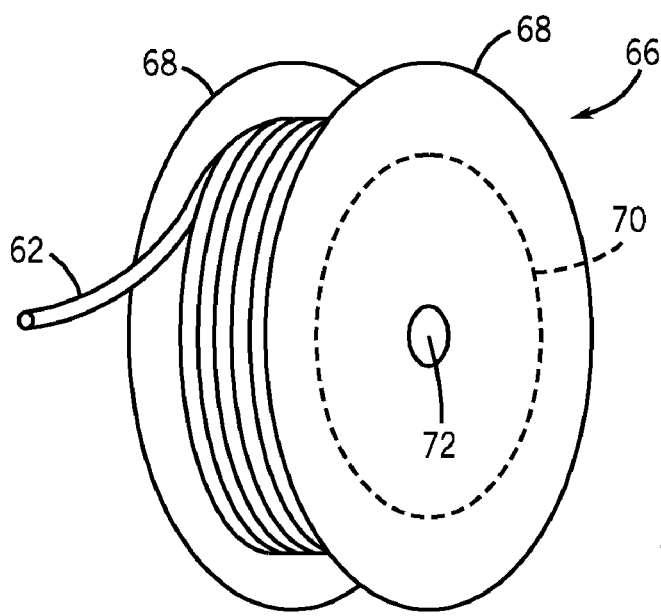
FIG. 3 is an illustration of an exemplary embodiment of a spool of the torch of FIG. 2.

In one embodiment, the spool assembly 64 may include a generally round spool 66 that rotates about the spool axis 67. For example, as depicted in FIG. 3, the spool 66 may include two rims 68 at the ends of a cylindrical center 70 with filler material 62 wound about the cylindrical center 70. In one embodiment, the spool 66 may be approximately 2 inch to 3 inches in total diameter. Further, the spool 66 may include a spindle hole 72 that extends through the spool axis 67 to facilitate mounting the spool 66 to a spindle, for example. Thus, the filler material 62 may be stored on the spool 66 and discharged by rotating the spool 66 about the spindle. The spool 66 may take a variety of forms to accommodate storing and dispensing the filler material 62. For example, the spool 66 may be increased or decreased in dimensions to accommodate more of less filler material 62, or may take a variety of shapes. Further, the body of the spool 66 may be formed from a wireframe body or a solid body configured to support the filler material 62 and interface with other components of the spool assembly 64 and the torch 18. Various spool geometries may be used to minimize wire cast and helix.

Figure 4:
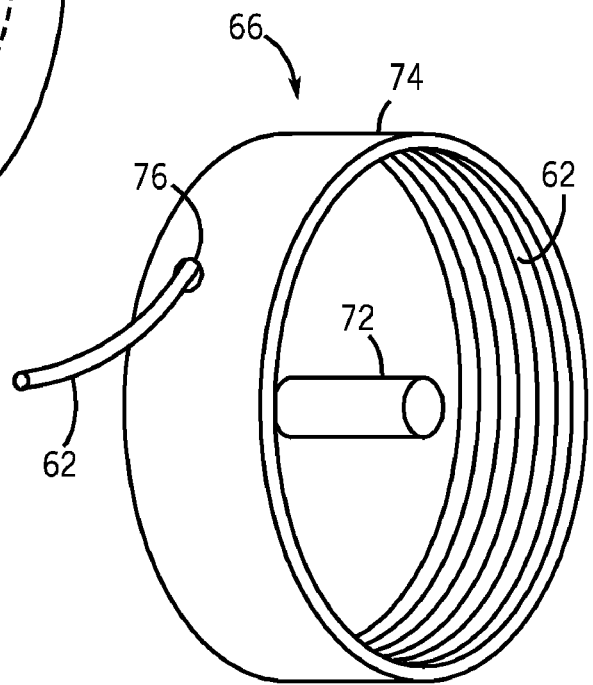
FIG. 4 is an illustration of an alternate embodiment of a spool of the torch of FIG. 2.

In another embodiment, the spool 66 may include an enclosed cylinder 74. For example, as depicted in FIG. 4, the enclosed cylinder 74 may allow filler material 62 to be coiled about the interior of the spool 66 and discharged through an exit hole 76. Thus, similar to the previous embodiment, the filler material 62 may be stored in the spool 66 and discharged by drawing the filler material 62 from the spool 66. Further, the spool 66 may include a spindle hole 72 coaxial with the spool axis 67 to facilitate mounting the spool 66 to a spindle.

In addition, the spool 66 may also provide for interchangeable spool cartridges. For example, in one embodiment, the spool assembly 64 may include a common coupling device, such as a spindle hole 72. Thus, multiple spools 66 may be coupled to the spool assembly 64. For example, an operator may exchange an empty spool 66 for a pre-loaded spool 66 by simply removing the empty spool and replacing it with a spool 66 that is pre-loaded with filler material 62. The spool 66 may include a variety of shapes and sizes that are capable of providing a variety of filler material configurations. Thus, the spool 66 may provide for filler material 62 of differing amounts, types, and sizes to be stored on and dispensed from the spool 66.

Figure 5:
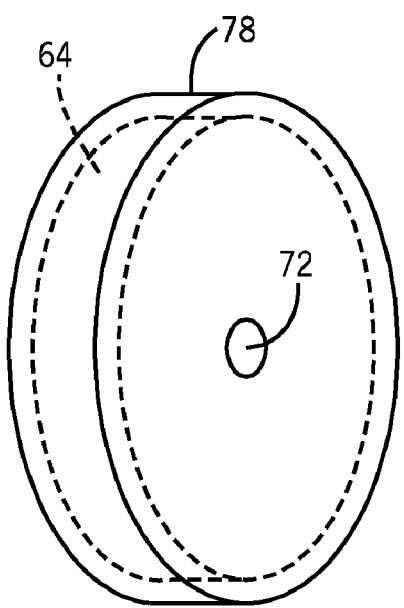
FIG. 5 is an illustration of an exemplary embodiment of a spool cover.

The spool assembly 64 may also include a spool cover 78. For example, as depicted in FIG. 5, the spool cover 78 may include a body that surrounds the spool 66 and the filler material 62 disposed on the spool 66. The spool cover 78 may slide off the spool 66 and be secured by an interference fit, for example. In one embodiment, the spool cover 78 may be configured to provide protection of the filler material 62 from the surrounding welding environment and during storage. For example, the spool cover 78 may include a rigid material configured prevent physical impacts from severing the filler material 62. In an additional embodiment, the spool cover 78 may include insulating properties to protect the filler material 62 from the temperatures near the weld location to prevent the filler material 62 from melting on the spool 66 before it is advanced to the weld location. In addition, the spool cover 78 may be coupled to the torch 18 and include keying features to assist the operator in more easily aligning the spool 66 when it is assembled. Further, the spool cover 78 may include an indicator to display to the operator the type or amount of filler material 62 remaining on the spool 66.

The spool assembly 64 and/or the torch 18 may also include a route to manipulate and shield the filler material 62 as it is discharged from the spool 66. For example, to properly align the filler material 62 with the weld location and the weld pool, the spool assembly 64 and/or the torch 18 may include a positioning device 80 (see FIG. 2). For example, as depicted in FIG. 2, the positioning device 80 may include a channel 82 that passes through and/or around the handle 46 of the torch 18 and through a positioning extension 84, and that facilitates delivery of the filler material 62 to the weld location. In other words, the positioning device 80 acts as a guide to direct the filler material 62 in the proper direction, spacing, rotation and general orientation relative to the electrode 44, the weld location, joint and direction of travel.

The positioning device 80 may take a variety of forms suitable for aligning the filler material 62 with the weld location. For example, in one embodiment, the channel 82 of the positioning device 80 may run internal to the handle 46, as depicted by FIG. 2. In another embodiment, the channel 82 and the positioning extension 84 may include a single tube external to the handle 46 that runs the length of the handle 46 and spans the distance between the spool 66 and the weld location.

In the illustrated embodiment, the positioning extension 84 includes a guide axis 85A and an exit axis 85B. The guide axis 85A runs along a length of a portion of the channel 82 that extends from the torch handle 46 to a bend in the positioning extension 84. The exit axis 85B runs along a length of the channel 82 in the positioning extension 84 from the bend in the positioning extension 84 to an end of the positioning extension 84 proximate the electrode 44. In the illustrated embodiment, the guide axis 85A is parallel and offset from the body axis 53, the nozzle axis 59, and the electrode axis 61. The exit axis 85B intersects the guide axis 85A and the electrode axis 61. Further, the guide axis 85A, the exit axis 85B, the handle axis 47, body axis 53, the nozzle axis 59, and the electrode axis 44 are all located in a single plane.

The end of the positioning device 80 proximate the weld location may include various forms to control the direction, spacing, rotation and general orientation of the filler material 62 relative to the weld location, joint and direction of travel. In one embodiment, the tip of the positioning device 80 may be coupled to the nozzle 56. For example, as depicted in FIGS. 2, 6, and 7, the positioning extension 84 may be coupled to the body of the nozzle 56. In one embodiment, the nozzle 56 may be formed as a single piece that includes a channel defining the positioning extension 84. In another embodiment, the positioning extension 84 may be welded, or similarly attached, to the nozzle 56. Thus, as the nozzle 56 is rotated about the electrode axis 61, the position of the filler material 62 may be modified.

With a path for the filler material 62 provided, a mechanism may be used to advance the filler material 62 from the source of filler material (e.g. the spool 66) to the weld location. In one embodiment, the spool assembly 64 may include a drive to pull or push the filler material 62 from the spool 66 through the positioning device 80. For example, as depicted in FIG. 2, the spool assembly 64 may include a motor 86 configured to rotate the spool 66 counter-clockwise and advance the filler material 62 from the spool 66. The motor 86 may be mechanically coupled to the spool 66 and rotate the spool 66 when power is supplied to the motor 86. Thus, the filler material 62 may be pushed from the spool 66 to the weld location via the positioning device 80. The spool assembly 64 and motor 86 may have a variety of configurations. For example, in one embodiment, the motor 86 may transfer torque to the spool 66 via mechanical coupling to a spindle along the axis of the spool 66.

Although pushing the filler material 62 may be appropriate in some embodiments, pulling the filler material 62 from the spool 66 may be advantageous to prevent bucking of the filler material 62 as it advances to the weld location. Thus, in one embodiment, the spool assembly 64 may be configured to pull the filler material 62 from the spool 66. For example, as depicted in FIG. 6, the spool assembly 64 may include the motor 86 configured to draw the filler material 62 from the spool 66 and advance the filler material 62 to the weld location via the positioning device 80. An embodiment may include the motor 86 rotating at least one of two puller-wheels 88 to draw the material from the spool 66. For example, in one embodiment, the gap between the puller wheels 88 may be sufficiently small to maintain a pressure on the filler material 62 and enable the torque transferred from the motor 86 to the puller wheel(s) 88 to advance the filler material 62 to the weld location via the positioning device 80. The motor 86 and puller wheels 88 may be provided in a variety of configurations. For example, in one embodiment, the motor 86 and puller wheels 88 may be located at the end of the positioning device 80 near the weld location and, thereby, pull the filler material 62 through the positioning device 80.

Reducing the travel distance of the filler material 62 also may reduce the force needed to move the filler material 62 and may reduce the complexity of the routing mechanism. In one embodiment, the filler material 62 may be attached to the torch 18 at or near the torch body 48. For example, as depicted in FIG. 7, the spool assembly 64 may be coupled to the torch neck 50. Thus, the filler material 62 may be discharged from the spool 66 into the positioning device 80 proximate to the weld location. The spool assembly 64 may be coupled to the torch 18 in a multitude of configurations. For example, the spool assembly 64 may be coupled to the handle 46, the torch neck 50, the torch head 52, or a combination thereof. The spool assembly 64 may incorporate a pushing motor/device coupled to the spool 66, or a pulling motor/device that is positioned between the spool 66 and the weld location, as discussed previously.

Another embodiment may position the spool assembly 64 above the torch body 48. For example, as depicted in FIG. 8, the torch 18 may include an in-line design that couples the spool assembly 64 generally along the electrode axis 61 and/or the body axis 53. In such an embodiment, the positioning device 80 may run the length of the torch 18, and thus reduce the bending of the filler material 62 as it is routed from the spool 66 to the weld location. The reduced bending of the filler material 62 may enable use of a thicker gauge wire of filler material 62. The spool assembly 64 and a housing 90 may be configured in any suitable arrangement to provide the filler material 62 to the weld location. For example, the spool 66 may be coupled to a motor 86 to push the filler material through the positioning device 80. Further, the spool assembly may include a motor separate from the spool 66 that is configured to pull the filler material 62 from the spool 66. For example, a motor may be located in the housing 96 to draw the filler material 62 from the spool 66. Similar to the previously discussed embodiments, the guide axis 85A is parallel and offset from the body axis 53, the nozzle axis 59, and the electrode axis 61. The exit axis 85B intersects the guide axis 85A and the electrode axis 61. Further, the guide axis 85A, the exit axis 85B, the handle axis 47, body axis 53, the nozzle axis 59, and the electrode axis 61 are all located in a single plane.

The torch 18 also may incorporate a remote 92 to signal the motor 86 to operate to advance or retract the filler material 62. In one embodiment, the remote 24 may include a trigger located on the torch 18. For example, as depicted in FIG. 9, the trigger of the remote 92 may enable a user to depress the trigger to compete the circuit between the power source 12 and the motor 86. In another embodiment, the remote 92 may include a foot pedal. For example, as depicted by FIG. 10, the foot pedal of the remote 92 may be depressed to complete the circuit between the power source 12 and the motor 86. The signal to operate the motor 86 may be provided by any suitable source. For example, the motor 86 may be operated by a circuit configured to respond to voice commands of the operator. Further, the power supply used to power the motor 86 may include a battery or other power source independent from the system power source 12.

Another embodiment may include a control algorithm to advance the filler material 62 in response to the signal to an operator's signal to advance the filler material. For example in one embodiment, although the filler material 62 may generally be advanced forward, the filler material 62 may be advanced into the molten puddle and then retracted to provide weld that resembles a series of puddles. Retraction also eliminates ball formation on the end of the wire. Further, the control algorithm may be carried out in accordance with a signal from the power supply or a control located on or proximate to the torch 18.

Although a motor 86 may provide for automated discharge of the filler material 62, other welding systems 10 may be more suited for manual advancement of the filler material 62. These may include high precision welding systems 10 in which an operator advances the filler material 62 at a slower feed rate. In one embodiment, a feed mechanism for the filler material 62 may include a finger operated control. For example, as depicted in FIG. 11, the torch 18 includes a feed assembly 94 having a housing 96, a manual advancement mechanism 97, and the positioning extension 84. In operation, the filler material 62 may be inserted and/or stored in the housing 96, and advanced to the weld location and/or the electrode 44 via the positioning device 80 in response to the operator activating the manual advancement mechanism 97.

In one embodiment, the housing 96 may be coupled to the handle 46 and/or torch body 48. For example, the housing 96 may include a rigid structure that is coupled to and runs along the length of the handle 46 (e.g., parallel to the handle axis 47). Further, the housing 96 may include a central channel 98 that runs along its length. The central channel 98 may be parallel to the handle axis 47, as illustrated. Further, the central channel 98 may include a cylindrical hole or tube that enables a generally round tube or wire of the filler material 62 to be inserted into the channel 82 via an inlet 99 of the housing 96 proximate an end of the handle 46 that is opposite the torch body 48. Further, the central channel 98 may be coaxial with and/or include at least portion of the channel 82 of the positioning extension 84. In other words, the central channel 98 and the channel 82 of the positioning device 80 may define a continuous channel. Accordingly, in one embodiment, the operator may insert the filler material 62 into the central channel 98 of the housing 96 via the inlet 99, and engage the manual advancement mechanism 97 to advance the filler material 62 through central channel 98 and the channel 82 of the positioning device 80. In turn, the positioning extension 84 ejects the filler material 62 proximate the electrode 44. Similarly, the operator may engage the manually advancement mechanism 97 in the reverse direction to retract the filler material 62.

The manual advancement mechanism 97 may include any variety of devices that facilitate manual advancement of the filler material 62. For example, in the illustrated embodiment, the manual advancement mechanism 97 includes a dial 100 that can be rotated to advance the filler material 62. For example, in one embodiment, a circumference of the dial 100 directly contacts the filler material 62. Accordingly, rotating the dial 100 exerts a force on the filler material 62 that causes the filler material 62 to advance or retract. In another embodiment, the manual advancement mechanism 97 may include a slide 102 in place of, or in addition to, the dial 100. The slide 102 may be may be coupled to or abut the filler material 62, such that moving the slide 102 exerts a force on the filler material 62 that causes the filler material 62 to advance or retract. For example, the slide 102 may be moved in a direction parallel to the handle axis 47 and in the direction of the torch head 52 to advance the filler material 62 and/or the slide 102 may be moved in an opposite direction to retract the filler material 62.

Further, the manual advancement mechanism 97 may include a device that is suited for thumb operated control and/or may be integrated to a variety of welding devices. For example, as depicted in FIG. 12, a goose-neck type torch 18 may include a feed assembly 94 integral to the torch 18. As illustrated, the feed assembly 94 includes an integrated handle 46 and housing 96, the manual advancement mechanism 97, and the positioning device 80. In one embodiment, the housing 96 may be directly coupled to the handle 46, include the central channel 98 to facilitate insertion of a filler wire 62, and provide a location for the operator to grip the torch 18. Further, the torch 18 may include the manual advancement mechanism 97 embedded in the housing 96, thus facilitating manually advancing the filler material 62 through the positioning device 80 to the weld location with the use of a single hand.

Other embodiments may include any form of the manual advancement mechanism 100 that facilitates an operator to manually advance the filler material 62 through the positioning extension 84. For example, the embodiments of FIGS. 11 and 12 may incorporate a spool that is capable of being manually advanced in a similar fashion. Thus, a coil of wire filler material 62 may be used in place of, or in addition to, the rod of filler material 62. In other embodiments, the manual advancement mechanism 97 may include other forms of knobs or buttons configured to advance the filler material 62.

It will be appreciated by those ordinarily skilled in the art that the embodiments described may be configured in any suitable combination of features. For example, a motor 86 may be configured for use on the embodiments of FIG. 11 and FIG. 12. Thus, a motor 86 may be used to advance a straight filler material 62 (e.g., rod or wire) as opposed to a coil of filler material 62 advanced from a spool 66. Moreover, the manual advancement mechanism 97 may act as a trigger to engage an electrical drive, such as the motor 86.

As mentioned previously, the positioning extension 84 may be used for alignment of the filler material 62 to the weld location. As depicted in FIGS. 2, 6, 7, 8, 11 and 12, the positioning extension 84 may include a tube that is rigidly coupled to the torch 18. However, in some embodiments it may be beneficial to enable adjustment of the positioning extension 84. In other words, it may be beneficial for the positioning extension 84 to be manipulated between at least a first and a second position. For example, one embodiment may include the positioning extension 84 being configured to flexibly adjust the location and exit of the positioning extension 84. Thus, an operator may simply adjust the positioning extension 84 to control where and how the filler material 62 is ejected relative to the electrode 44 and the weld location. In one embodiment, the positioning extension 84 may be formed from a flexible material that enables the positioning extension 84 to be deformed such that the filler material 62 is ejected at a different point, angle, and/or along a different axis. In another embodiment, only a segment of the positioning extension 84 may be formed from relatively pliable material that is deformable. In another embodiment, the positioning extension 84 may include two sections (e.g., a first section and a second section) that are configured to pivot relative to one another. For example, a first portion of the positioning extension 84 along the guide axis 85A may pivot relative to a second portion of the positioning extension along the exit axis 85B. The two portions may be joined by a portion of the positioning extension 84 having a reduced cross-section, a hinge, a ball and socket, or any other suitable pivoting device. In yet another embodiment, the positioning extension 84 may include a corrugated or ribbed tubing that is capable of flexing and bending to vary the orientation and/or position of the positioning extension 84.

The torch 18 may also include additional shielding and configurations that protect the filler material 62 from the heat produced by the welding process. For example, in one embodiment, the positioning extension 84 may include thermal insulation to shield the filler material 62 from the high temperatures proximate the electrode 44. In one embodiment, an insulating component, such as an insert, may be disposed internal, external, or integral to the positioning extension 84 and/or the channel 82. In another embodiment, spool assembly 64, feed assembly 94 and/or positioning device 80 may be formed from a refractory material capable of with standing the elevated temperatures proximate to the molten material of the weld pool and the arc. Components of the feed assembly 94 may be formed from any variety materials, including but not limited to: alumina ceramic, titanium, tungsten, plastic, glass filled plastic, ceramics, copper, stainless steel or other materials.

As described in the previous embodiments, the torch 18 may include multiple components that provide for storage, advancement, and alignment of the filler material 62. In an embodiment, these components may be manufactured as part of the torch 18. However, it may be beneficial to add the spool assembly 64, the feed assembly 94, the positioning device 80, and/or other components to the torch 18 and system 10 subsequent to manufacture (e.g., retrofitting). In one embodiment, the spool assembly 64 and/or the feed assembly 94 may be an add-on device that is capable of being coupled to the welding torch 18. For example, the spool assembly 64 and/or feed assembly 94 may include a separate component that an operator can subsequently attach to the torch body 48. The spool assembly 64, the feed assembly 94, the positioning device 80, and/or other components may be attached to the torch 18 in a variety of configurations. These components may be attached to other components on or proximate to the torch 18, including the supply conduit 20, the coolant supply conduit 34, and/or the coolant return conduit 36, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding system, comprising:
 a welding gun; and
 a welding wire feed directly coupled to the welding gun, comprising:
  a filler material housing;
  a filler material positioning extension; and
  a manual advancement device configured to advance and retract a filler material through the welding wire feed via a manual force.

2. The welding system of claim 1, wherein the welding gun comprises a torch body extending crosswise to a torch handle, and the manual advancement device is coupled to the torch handle.

3. The welding system of claim 2, wherein the filler material housing comprises a housing channel extending internally through the torch handle, the filler material positioning extension comprises an extension channel extending externally from the torch handle toward a torch tip of the torch body, and the housing channel and the extension channel define a contiguous channel to support and route the filler material to a weld location.

4. The welding system of claim 2, wherein the torch body comprises an electrode extending from a torch tip, and the manual advancement device is disposed on a side of the torch handle facing away from the electrode.

5. The welding system of claim 4, wherein a first axis of the torch handle, a second axis of the torch body, and a third axis of the filler material positioning extension are disposed in a common plane.

6. The welding system of claim 5, wherein the filler material housing comprises a housing channel having an inlet configured to accept the filler material and an outlet at an opposite end of the internal channel, the outlet is coupled to a channel of the filler material positioning extension, and the inlet is disposed at an axial end portion of the torch handle opposite from the torch body.

7. The welding system of claim 5, wherein the filler material housing comprises an internal channel extending through the torch handle to the filler material positioning extension, and a fourth axis of the internal channel is disposed in the common plane.

8. The welding system of claim 7, wherein the filler material housing is integral to the torch handle.

9. The welding system of claim 1, wherein the manual advancement device comprises a dial configured to advance and retract the filler material in response to manual rotation of the dial.

10. The welding system of claim 9, wherein the dial is configured to transfer the manual force directly from a user to the filler material through the dial.

11. The welding system of claim 1, wherein the manual advancement device comprises a slide configured to advance and retract the filler material in response to manual movement of the slide.

12. The welding system of claim 11, wherein the slide is configured to transfer the manual force directly from a user to the filler material through the slide.

13. The welding system of claim 1, wherein the manual advancement device is arranged such that an operator can simultaneously hold the welding torch and advance the filler material with one hand.

14. The welding system of claim 1, wherein the manual advancement mechanism is embedded in the filler material housing.

15. The welding system of claim 1, wherein the filler material positioning extension is configured to move between a first position and a second position.

16. The welding system of claim 15, wherein the filler material positioning extension comprises a first section and a second section, wherein the first section and the second section are configured to pivot relative to one another.

17. The welding system of claim 15, wherein the filler material positioning extension is rotatable about an axis of an electrode separate from the filler material.

18. The welding system of claim 15, wherein the filler material positioning extension comprises a flexible tubing configured to move between the first position and the second position.

19. The welding system of claim 18, wherein the flexible tubing comprises a corrugated or ribbed tubing.

20. The welding system of claim 1, wherein the filler material positioning extension comprises a thermal insulating tubing.

21. The welding system of claim 1, wherein the manual advancement device comprises a one-piece structure configured to transfer the manual force directly from a user to the filler material through the one-piece structure.

22. A system, comprising:
a wire feeder retrofit kit, comprising:
a wire feeder, comprising:
a filler material housing;
a filler material positioning extension; and
a manual dial configured to impart a manual force on a filler material to move the filler material through the filler material positioning extension,
wherein the wire feeder is couplable to a welding gun, and the wire feeder is configured to guide the filler material toward an electrode of the welding gun.

23. The system of claim 22, comprising the welding gun including a tungsten inert gas (TIG) torch.

24. The system of claim 22, wherein the filler material housing comprises an interchangeable spool.

25. The system of claim 22, wherein the manual dial is configured to transfer the manual force directly from a user to the filler material through the manual dial.

26. The system of claim 22, wherein a circumference of the manual dial is configured to contact the filler material.

27. A welding system, comprising:
a welding gun comprising a torch handle, a torch body angled relative to the torch handle, and an electrode extending from a torch tip of the torch body; and
a welding wire feed directly coupled to the welding gun, comprising:
an internal conduit extending through the torch handle;
an external extension conduit extending from the internal conduit toward the torch tip; and
a manual advancement device configured to move a filler material through the internal conduit and the external extension conduit, wherein the manual advancement device is disposed along the internal conduit.

* * * * *